United States Patent [19]

Davis

[11] 4,351,873
[45] Sep. 28, 1982

[54] DOUBLE FACED INSULATING BOARD

[75] Inventor: Duane A. Davis, Plainfield, N.J.

[73] Assignee: GAF Corporation, New York, N.Y.

[21] Appl. No.: 174,045

[22] Filed: Jul. 31, 1980

[51] Int. Cl.³ ................ B32B 3/26; B32B 5/18; B32B 7/14

[52] U.S. Cl. ................... 428/198; 156/291; 428/215; 428/246; 428/282; 428/284; 428/305.5; 428/314.4; 428/317.1; 428/422.8; 428/423.1; 428/489

[58] Field of Search .............. 428/198, 213–215, 428/282, 246, 284, 285, 305.5, 314.4, 314.8, 422.8, 423.1, 489, 317.1, 317.5, 317.7; 156/291

[56] References Cited

U.S. PATENT DOCUMENTS

| | | | |
|---|---|---|---|
| 3,251,727 | 5/1966 | Reynolds et al. | 428/198 |
| 3,360,423 | 12/1967 | Lindberg | 428/198 |
| 3,411,256 | 11/1968 | Best | 428/314.4 |
| 3,459,628 | 8/1969 | Dixon et al. | 428/314.4 |
| 3,746,604 | 7/1973 | Reynolds | 428/317.7 |
| 4,039,709 | 8/1977 | Newman | 428/198 |
| 4,073,998 | 2/1978 | O'Connor | 428/285 |
| 4,111,081 | 9/1978 | Hilliard et al. | 428/198 |
| 4,136,223 | 1/1979 | Harder | 428/309.9 |
| 4,287,248 | 9/1981 | Gessner et al. | 428/198 |

*Primary Examiner*—William J. Van Balen
*Attorney, Agent, or Firm*—James Magee, Jr.; J. J. Ward; J. G. Mohr

[57] ABSTRACT

Double faced rigid polyurethane foam insulating board in which the first facing is adhered directly to the urethane foam and in which a second facing is intermittently adhered to and spaced from the first facing by areas of adhesive spaced so as to allow unrestricted lateral venting of gases from between the facings to the edges of the board.

10 Claims, 2 Drawing Figures

DOUBLE FACED INSULATING BOARD

BACKGROUND OF THE INVENTION

Rigid polyurethane foam insulating boards are extensively used in the construction of built up roofs and as sheathing for insulation of side walls of buildings. Such boards are usually faced with asphalt saturated roofing felt, metal foil or other suitable facing materials. It has, however, been difficult with heretofor known insulation of this type to obtain adequate stability to changing moisture and temperature conditions and the consequent variations in pressure between the facing of the insulating board and the overlying roofing membrane. For instance, when roofing membrane is applied to rigid polyurethane board insulation during the construction of a build up roof, hot asphalt is generally mopped onto the facing of the insulating board and the first ply of roofing membrane is then applied immediately after application of the hot asphalt. Moisture in the saturated felt facing volatilizes and causes frothing of the mopping asphalt. This frothing frequently continues after the first ply of roofing membrane is in place and the pressure generated by the trapped vapors causes localized floating or lifting of the roofing membrane. These lifted areas can be the focus for subsequent blister formation during the next several years as the completed roof ages. Even when non-absorbent facings such as metal foil are used problems frequently arise when hot asphalt is mopped onto the facing and thereby heats gases contained within the foam structure. Since vapors cannot escape through the facing, blistering and delamination of the facing from the foam frequently occurs.

Various methods have been tried to alleviate the above difficulties, but none have been totally successful. It is, for instance, common practice to apply a second facing containing a large number of holes to the insulating board immediately prior to mopping with hot asphalt. The hot asphalt then passes through the holes and secures the second facing to the first facing. This technique reduces the area of facing on the board subject to problems of the sort described above due to contact with the hot asphalt, but, of course, cannot eliminate such problems.

It has also been suggested in U.S. Pat. No. 4,136,223 to utilize a perforated facing on the foam with a second facing being utilized so that the foam material itself forms spots of adhesive to secure the second facing to the remainder of the composite board. This should reduce problems due to direct contact of hot asphalt with the primary facing on the foam, but would allow excessive exposure of the foam material to air with the consequent opportunity for replacement of fluorocarbon gases in the foam with air. As is well known in the industry, the thermal conductivity (K value) of insulating boards containing flurocarbon gas is substantially reduced where some means is not provided to prevent free exchange of fluorocarbon gas normally contained within the cells of the foam insulation with air.

SUMMARY OF THE INVENTION

The present invention provides a novel thermal insulating board and a process for making such boards which substantially avoids the problems discussed above.

The product of the invention is thermal insulating board comprising:

(a) a rigid closed cell foam core, the cells of which contain fluorocarbon gas;

(b) a first continuous facing continuously adhered to a face of said core, said first facing being non-porous; and (c) a second continuous facing intermittently adhered to and spaced from said first facing by areas of water resistant adhesive, said second facing being non-absorbent and said areas of adhesive being spaced so as to allow unrestricted lateral venting of gases from between the facings to the edges of the board.

Preferred product is insulating board in which the foam core is polyurethane or polyisocyanurate foam. The first facing is preferably asphalt saturated roofing felt or asphalt saturated fiberglass mat and the second facing is preferably asphalt saturated fiberglass mat.

The process of the invention is a process for making thermal insulating board comprising:

(a) forming a rigid closed cell foam core, the cells of which contain fluorocarbon gas and which has continuously adhered to a face thereof a first continuous facing which is nonporous;

(b) applying water resistant adhesive to selected areas of said first facing; and (c) applying a second continuous facing which is non-absorbent over the thus applied adhesive so that the areas of adhesive serve to adhere the second facing to the first facing while simultaneously spacing the second facing from the first facing in the areas in which adhesive is applied and allowing unrestricted venting of gases from between the facings to the edges of the board.

DETAILED DESCRIPTION OF THE INVENTION

Figure 1:
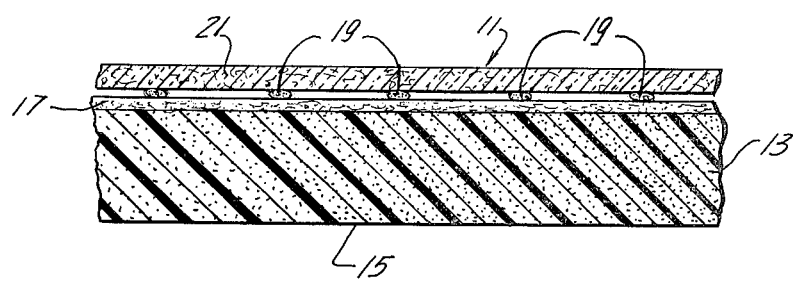
FIG. 1 is a sectional elevation view of a portion of insulating board according to the invention.
Figure 2:
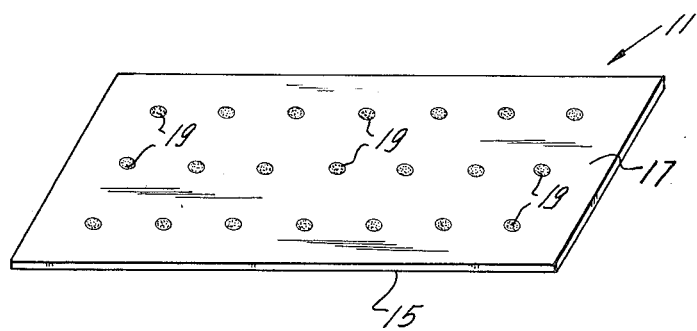
FIG. 2 is a sectional plan view of a portion of an insulating board according to the invention.

Insulating board of the invention has a core of conventional rigid closed cell foam material, the cells of which contain fluorocarbon gas. Polyurethane or polyisocyanurate foams are preferred but other foamable polymers containing flurorocarbon gas in the cell structure can be used. Suitable polymers may included for instance polyvinyl chloride, urea aldehydes, melamine, aldehydes, polystyrene, polypropolyene, polyethylene, epoxy resin, acrylonitrile-butadiene-styrene copolymer, cellulose acetate, etc.

In the manufacture of polyurethane foam cores of product of the invention suitable isocyanates include polymethylene polyphenyl isocyanate, diphenylmethane diisocyanate triphenylmethane triisocyanate. Suitable hydrogen donors for use in rigid foams are polyols of high functionality, some of which may be classified as polyethers, while others are sucrose derivatives, sorbitol derivatives and glycerol derivatives. Chlorinated and/or phosphorus-containing polyols are suitably used where flame resistance is desirable. Such polyols include hydroxy-terminated polyesters based on chlorendic acid and similar polyesters of tetrachlorophthalic acid. Hydroxylic pentaerythritol phosphites containing 15–20% of phosphorus can be polymerized by heating then until the viscosity at 25° C. has reached at least 20,000 centipoises, the product being polymeric organophosphite polyols which are suitable for interaction with polyisocyanates. Small quantities of castor oil are suitably used in the formulation when a rigid foam having good impact strength and good electrical properties is required. In general, it is desirable that the polyol have an average of at least three terminal hydroxy groups and have a hydroxyl number within the range of about 250 to about 750. Such polyols include polyethers prepared by the propoxylation of a triol such as glycerine; of a tetrol such as pentaerythritol; of a pentol such as arabitol; or of a hexol such as sorbitol. Other suitable polyols include hydroxyterminated polyesters having a molecular weight within the range of about 400 to 4,000, such as polyfunctional glycerine or trimethylolpropanediethylene glycol or propylene glycol condensation products esterified with acids such as adipic, succinic and sebacic acid.

As mentioned, polyisocyanurate type polymers are also preferred for the foam cores of product of the invention. Such isocyanurate foams are well known and are usually based on trimerization of isocyanates such as those mentioned above in the presence of a catalyst. Suitable catalytic systems include methal oxides such as lithium oxide or tributyl tin oxide; alkoxides such as benzyl trimethyl ammonium methoxide, sodium methoxide, potassium tertbutoxide and borates; amines including triethylamine, dimethylbenzylamine, 2,4,6-tris(-dimethylaminomethyl) phenol, 2,4- or 2,6-bis(dimethylaminomethyl) phenol, N,N,N'-tris(dimethylaminopropyl symhexahydrotriazine; metal bydrides such as sodium borohydride, carboxylates such as sodium formate, sodium carbonate, potassium acetate, calcium acetate, mixtures of sodium benzoate and dimethylformamide, also alkali methal soaps, naphthenates, lead oleate salts and xanthates; hydroxides such as benzyl trimethylammonium hydroxide (usually in dimethyl sulfoxide); acids including hydrochloric acid, formic acid, aluminum trichloride, and Friedel-Crafts catalysts; organo-metallics, low molecular weight alkylenimides and aldehydes, as well as combination systems such as amines with epoxides, alchols, carbonates, alkylene imides, carboxylic acids or peroxides, also ammonium hydroxides-caramate systems.

Polyisocyanurate based polymers usually exhibit improved flame resistance over their all-polyurethane counterparts and withstand higher temperatures, and they may be prepared according to the well known one-shot method, i.e., the polyether glycol may be added to any additives such as (silicon) surfactant, blowing agent, etc. followed by the addition of a polyisocyanate and a trimerization catalyst while thoroughly agitating the mixture.

The blowing agent may usually comprise from about 5 to about 15 wt.% of the combined weight of polyol and polyisocyanate and is preferably used in amounts sufficient to provide for a foam having a density between about 1.5 and about 3.0 lb. per cubic ft.

Suitable catalysts for use in making polyurethane foams include for instance, tiethylenediamine, bis(2-dimethylaminoethyl)ether, dibutyltin dilaurate and stannous octoate.

The polysocyanate and polyols should normally be proportioned so as to provide for substantially equivalent amounts of the two ingredients for the product of polyurethane foams, although it is desirable to employ a slight excess of polyisocyanate. For production of polyisocyanurate foams a sufficient excess of polyisocyanate is required so that the active hydrogen groups present in the polyol are less than 50% of the number of isocyanate groups present in the polyisocyanate of the reaction mixture. Foam cores suitable for use in the invention frequently utilize any of the stabilizers known to those skilled in the art including dimethyl polysiloxane, polyepoxylated vegetable oils, polyepoxylated fatty acids, polyepoxylated phenols and sorbitan mono esters. If foam stabilizer is used, a desirable amount is in the range between 0.01 and about 5 wt% based on total reactants.

Surfactants, dyes and other special additives may, of course, be used in the manner well known in the art and where used are normally present in amounts between about 0.1 and about 2.0 wt.% based on total reactant.

Insulating board of the invention has on at least one face of the rigid foam core two continuous facings. The first facing is non-porous and is continuously adhered to the core, while the second facing is intermittently adhered to and spaced from the first facing by areas of water resistant adhesive, and areas of adhesive being spaced so as to allow unrestricted lateral venting of gases from between the facings to the edges of the board. The second facing is nonabsorbent. As used herein the term "nonporous" is intended to refer to materials which have an air porosity of at least about 30 seconds as measured in a Gurley densomiter (400 ml, 1 layer). Such materials are not sufficiently porous to permit liquid water or hot asphalt to pass through the facing. The term "nonabsorbent" is intended to apply to materials which do not contain more than about 1.0 wt.% moisture internally after soaking for 24 hours in water and surface drying for 2 hours at 50% relative humidity and 70° F. Suitable materials for the first continuous facing which is continuously adhered to the rigid foam core include such nonporous facing materials as metal foil, asphalt saturated fiber glass mat or asphalt saturated roofing felt. Conventional asphalt saturated roofing felt is preferred. Suitable asphalt saturated felts are described for instance in ASTM D-226 while suitable asphalt saturated fiberglass mats include those specified in ASTM D 2178 (types III or IV) provided they are nonporous. So long as the material of the first facing is continuously adhered to the foam core and is non-porous, the material itself can be selected with other considerations in mind, such as retention of K factor with aging, dimensional stability, etc. without the necessity for being concerned about contact with hot asphalt, absorption of moisture, etc. Materials having relatively low permeability with respect to fluorocarbon gases are preferred in order to eliminate or reduce migration of fluorocarbon gases from the foam core and replacement thereof with air.

The second continuous facing intermittently adhered to the first facing as described above may likewise be made up of a number of suitable materials including metal foil or asphalt saturated fiberglass mats of the type mentioned above. The second continuous facing should, as mentioned above, be non-absorbent. Asphalt saturated glass mat is strongly preferred for the second facing. If metal foil is used for the second facing, it should be a heavy foil, e.g. aluminum foil of a thickness of at least about 0.05 millimeter to minimize the risk of breaking the facing during mopping operations in the installation of a built up roof.

Adhesive for use in the product and process of the invention must be resistant to water, i.e. must be adhesive which is not water soluble. Any conventional adhesive which is not water soluble and is capable of maintaining the desired spacing between the two facings in the areas of adhesion is considered satisfactory. Conventional type III roofing asphalt as described in ASTM D312 is especially preferred. Regardless of which particular adhesive is used, it is essential that the areas of adhesion between the first and second continuous facings be spaced so as to allow unrestricted lateral venting of gases from between the facings to the edges of the board, while at the same time ensuring some separation between the first and second facings at the areas of adhesion. Separation between the two facings other than at the areas of adhesion is not essential since natural pressures of any gases tending to escape from between the facings will create the necessary spacing when and as needed. In the areas of adhesion, however, it is generally preferred that the facings be spaced apart at least about 0.1 millimeter. The selection of areas of adhesion will normally, within the basic requirements set forth, be designed so as to accomplish other desired objectives such as the provision for sufficient adhesion to resist wind uplift in accordance with the Factory Mutual I90 test. In one preferred embodiment of the invention in which roofing asphalt is used as the adhesive, satisfactory results are obtained with an asphalt saturated organic felt first facing and an asphalt saturated fiberglass second facing by using 12 mm diameter by 0.5 millimeter thick spots of adhesive spaced on 75 mm centers. The adhesive used to adhere the second continuous facing to the first continuous facing preferably occupies between about 2 and about 10% of the surface area of the first facing with the remaining surface area being available for venting of gases between facings.

For a better understanding of the product of the invention, reference may be had to the drawings which show partial sectional and plan views of an insulating board according to the invention. The drawings show an insulating board 11 having a rigid closed cell polyurethane foam core 13 with facings 15 and 17 continuously adhered to the top and bottom faces of the core. Spots of adhesive 19 adhere a second facing 21 to the facing 17. The facing 17 is preferably asphalt saturated roofing felt and the facing 21 is preferably asphalt saturated fiberglass mat.

While not essential to the invention, it is preferred that both faces of the rigid foam core have facings adhered thereto. Normally, only one face of the core will be provided with the double facings required by the invention. The other face of the core may be faced in any conventional manner, such as with saturated asphalt or fiberglass facing, perlite board, etc.

Insulating boards of the invention will normally have core thicknesses ranging between about 25 and 100 mm depending upon the insulating value desired. Preferred saturated felt facing material normally has a thickness between about 0.5 mm and about 1 mm as does the preferred asphalt saturated fiberglass facing material.

In manufacturing insulating board of the invention according to the process of the invention, the foam ingredients may be prepared and delivered to a laminating machine in the usual manner with the rigid foam being formed and cured between facings also in a conventional manner. Once the rigid foam core having a facing adhered to at least one face thereof is formed, the adhesive may then be applied to the outer surface of the facing and the second facing then laminated to the first facing. Alternatively the second facing may be applied simultaneously with the first facing or the first and second facings may be adhered to each other before being applied to the foam core.

In forming insulating boards of the invention, it is preferred that the foam core be formed and cured in situ in contact with the first continuous facing so that the foam material itself may serve as the adhesive for bonding the first facing to the core. Alternatively, it is possible to form the core without facings and then bond facings to the core using any suitable adhesive. Asphalt emulsions, phenol-aldehyde adhesives, etc. are well known and suitable for this purpose.

EXAMPLE

The following example is intended to illustrate a preferred embodiment of the invention without limiting the scope thereof.

Polyurethane board was produced by applying a mixture of the following ingredients uniformly to a continuous sheet of asphalt saturated roofing felt:

|  | Parts by Weight |
| --- | --- |
| Isocyanate (polymethylene polyphenyl isocyanate) | 143.58 |
| Polyol A (sucrose amine polyol) | 77.0 |
| Polyol B (chlorinated polyol) | 24.7 |
| Water | 0.75 |
| Surfactant (silicon copolymer) | 1.8 |
| Catalyst ($N_1N$-dimethylyclohexamine) | 0.8 |
| $CCl_3F$ | 32.0 |

A second continuous sheet of asphalt saturated roofing felt was laid on top of the chemical mixture, and the sandwich entered a continuous laminator where the polyurethane chemicals foamed up and forced the asphalt saturated felts apart until they were restrained by the continuously moving platens in the laminator. The plates of the laminator were spaced to provide finished product having a thickness of 38 mm. The board was moving at a rate of about 60 feet per minute, and air temperature in the laminator was 150° F. The conditions of temperature and pressure in the laminator cause the foam to adhere to the asphalt saturated felts. The saturated felts used in foaming the board had the following composition:

| Cellulosic Fibers | 6.8 lbs. |
| --- | --- |
| Asphalt (155° F. S.P.) | 7.9 |
|  | 14.8 lbs. |

After exiting from the laminator, the continuous board was cut into 3'×4' units and a second facer (pre-cut to 3'×4') was applied to one side of each unit. The second facer was applied using asphalt having a softening point of 180° F. The adhesive was applied in uniformly spaced spots, each spot 12 mm in diameter and 0.5 mm thick. The adhesive spots were spaced apart on 75 mm centers.

The second facer was composed of uniformly dispersed glass fibers formed into a non-woven mat weighing 1 lb. per 100 sq. ft. and saturated on one side with an asphalt/clay emulsion. The unsaturated surface of the mat was placed in contact with the adhesive spots, and the double-faced units were placed face-up on a pallet and strapped in pallet loads containing 35 boards.

Boards so manufactured were tested by application to a roof using conventional techniques. The boards were adhered to a metal deck with steep asphalt (S.P. 180° F.) applied at the rate of 15 lb./100 ft.² The surface with the double facer was in the face-up position. Steep asphalt at a temperature of 450° F. was applied to the surface of the double-faced board at the rate of 25 lbs./100 ft.² Asphalt saturated and coated base sheet was rolled into the freshly applied asphalt. Control units consisting of standard insulation boards with only the single facer were treated in a similar manner.

When the asphalt was applied to the double-faced board, there was no frothing of the asphalt and the base sheet laid tightly against the insulation board. When asphalt was applied to the standard board, vigorous bubbling or frothing of the asphalt occurred, and slight lifting of the base sheet was seen as the trapped vapor forced the base sheet away from the insulation board.

While the invention has been described above with respect to preferred embodiments thereof, it will be understood by those skilled in the art that various changes and modifications may be made without departing from the spirit and scope of the invention.

What is claimed is:

1. Thermal insulating board comprising:
   (a) a rigid closed cell foam core, the cells of which contain fluorocarbon gas;
   (b) a first continuous facing continuously adhered to a face of said core, said first facing being non-porous; and
   (c) a second continuous facing intermittently adhered to and spaced from said first facing by areas of water resistant adhesive, said second facing being non-absorbent and said areas of adhesive being spaced so as to allow unrestricted lateral venting of gases from between the facings to the edges of the board.

2. Insulating board according to claim 1 wherein the core comprises polyurethane foam or polyisocyanurate foam.

3. Insulating board according to claim 2 wherein the first facing comprises asphalt saturated felt or asphalt saturated fiberglass mat and the second facing comprises asphalt saturated fiberglass mat.

4. Insulating board according to claim 2 wherein the first facing comprises asphalt saturated felt between about 0.5 and about 1 millimeter thick and the second facing comprises asphalt saturated fiberglass mat between about 0.5 and about 1 millimeter thick.

5. Insulating board according to claim 2 in which the adhesive covers between about 2 and about 10% of the surface area of the first facing.

6. Insulating board according to claim 2 wherein the core has a density between about 1.5 and about 3 lb/ft³.

7. Process for making thermal insulating board comprising:
   (a) forming a rigid closed cell foam core, the cells of which contain fluorocarbon gas and which has continuously adhered to a surface thereof a first continuous facing which is non-porous;
   (b) applying water resistant adhesive to selected areas of said first facing; and
   (c) then applying a second continuous facing which is non-porous over said selected areas of adhesive to thereby adhere the second facing to the first facing while simultaneously spacing the second facing from the first facing in the areas to which adhesive is applied and allowing unrestricted venting of gases from between said facings to the edges of the board.

8. Process according to claim 7 wherein the core comprises foamed polyurethane or polyisocyanurate.

9. Process according to claim 8 wherein the first facing is asphalt saturated felt or asphalt saturated fiberglass mat and the second facing is asphalt saturated fiberglass mat.

10. Process according to claim 9 wherein the core density is between about 1.5 and about 3 lb/ft³, the core thickness is between 25 and about 100 mm, and the adhesive covers between about 2 and about 10% of the surface area of the first facing and comprises roofing asphalt.

* * * * *